3,007,968
ETHERIFICATION OF HYDROXY AROMATIC ALDEHYDES

Arthur Alt, Kirkwood, Mo., assignor to Monsanto Chemical Company, St. Louis, Mo., a corporation of Delaware
No Drawing. Filed July 25, 1957, Ser. No. 674,034
2 Claims. (Cl. 260—600)

This invention relates to an improved method for the etherification of hydroxy aromatic aldehydes whereby each hydroxy substituent is converted to an alkoxy group by reaction with an alkyl chloride without reaction of the aldehyde group. This invention is particularly applicable to the etherification of hydroxy benzaldehydes having one or two hydroxy substituents, whereby each hydroxy substituent is converted to a methoxy group by reaction with methyl chloride without reaction of the aldehyde group.

It is well known that an aldehyde group is one of the most reactive of organic functional groups, being easily reduced and oxidized and taking part in a number of addition reactions, as well as being easily condensed under either acidic and basic conditions. Furthermore, the aldehyde group is more reactive than the hydroxy group; therefore, it would be expected that the aldehyde group of a hydroxy aromatic aldehyde would also react under reaction conditions wherein a hydroxy group of the same compound is etherified to produce an alkoxy group.

It has now been discovered that, under conditions hereinafter defined, a hydroxy group of a hydroxy aromatic aldehyde can be reacted with an alkyl chloride containing 1 to 4 carbon atoms to produce an alkoxy group with no significant reaction of the aldehyde group taking place.

By the process of this invention there is provided a relatively safe, simple, and commercially feasible method of producing alkoxy aromatic aldehydes from hydroxy aromatic aldehydes in high yields, and, particularly, methoxy benzaldehydes can be produced from hydroxy benzaldehydes in yields of the order of 95%.

In describing the conditions under which high yields can be obtained by the practice of the method of this invention, the terms "hydroxy group" and "alkoxy group" are used in the singular form; however, aromatic aldehydes having two alkoxy groups can be obtained by reaction of dihydroxy aromatic aldehydes with alkyl chloride under the same reaction conditions as stated for the reaction of the mono-hydroxy aromatic aldehydes.

In order to prepare alkoxy aromatic aldehydes by the process of this invention using hydroxy aromatic aldehydes, the hydroxy group is first converted to a metal salt group, that is, a metaloxy group, followed by reaction with alkyl chloride.

According to the process of this invention in its broadest aspect, a metal salt of a hydroxy aromatic aldehyde is reacted with alkyl chloride containing 1 to 4 carbon atoms, at temperatures of the order of 100° C. and under alkaline conditions at a pH of 9.0 to 9.5, to produce an alkoxy aromatic aldehyde. Operation outside of this pH range results in failure to obtain the high yields and pure product possible by the process of this invention due, at least in part, to excessive tar formation and/or excessive hydrolysis of alkyl chloride.

It has been found that, in addition to the above-mentioned advantages of the invention, by effecting the etherification reaction at a pH of 9.0 to 9.5, sufficient hydroxy aromatic aldehyde is always in solution, as metal salt as formed through a hydroxy group, so that the reaction is not retarded due to limited solubility effects.

In carrying out the process of this invention, wherein a hydroxy aromatic aldehyde is the starting material, the hydroxy group is first converted to a metal salt group, which is easily accomplished by mixing the hydroxy aromatic aldehyde with an aqueous solution of a metal hydroxide. This aqueous solution of hydroxy aromatic aldehyde and a metal hydroxide is prepared in a suitable reaction vessel capable of sustaining sub-atmospheric and super-atmospheric pressures (hereinafter termed an "autoclave"), or the solution may be prepared in a separate vessel and thereafter transferred to an autoclave. This aqueous solution is agitated and heated in order to facilitate solution of the hydroxy aromatic aldehyde. The temperature of the aqueous solution is raised to temperatures of the order of 100° C., and the pH is adjusted to about 9.0 to 9.5 by adding metal hydroxide if the pH is below 9.0 or adding hydroxy aromatic aldehyde if the pH is above 9.5. While maintaining reaction temperatures of the order of 100° C., the etherification reaction is effected by admitting simultaneously into the autoclave alkyl chloride and metal hydroxide, with the rate and amount of metal hydroxide added being such as will maintain the pH in the desired range of 9.0 to 9.5.

After etherification is completed, the reaction mixture preferably is adjusted to a pH of about 11 to 12 by the addition of metal hydroxide. Thereafter, the autoclave contents are cooled and the autoclave is vented. Usually about 15% to 20% excess alkyl chloride is required, including the amount lost after the reaction is completed.

After final adjustment of the pH, the mixture is allowed to stand until a water phase and an oil phase separate as substantially immiscible layers. The lower oil phase is essentially alkoxy aromatic aldehyde of generally about 98% purity, which is then separated from the water phase. Although the separation can be made at other pH's, a pH of 11 to 12 provides a reaction product of substantially higher alkoxy aromatic aldehyde assay and is materially conducive to the higher overall yields attainable by the practice of the process of this invention.

As a variant of the above step, after the final adjustment of the pH, filter aid is added to the mixture, the mixture is filtered, and the filtrate is allowed to stand until separation occurs. By this step, the time required for good separation of the alkoxy aromatic aldehyde phase from the water phase is materially reduced.

The following examples further illustrate the process of this invention. The parts are given in parts by weight.

Example 1

To an autoclave there were charged 234 parts of water and 46.7 parts of 50% sodium hydroxide. This solution was agitated and heated at 75–80° C. Vanillin (4-hydroxy-3-methoxy-benzaldehyde), in the amount of 97.5 parts, was added and the mixture agitated until the vanillin was completely in solution. The autoclave was evacuated to an absolute pressure of 30–66 mm. of mercury. The temperature of the solution was then raised to about 105° C. and the pH adjusted to 9.0 to 9.5. Methyl chloride in the amount of 37.9 parts, and 50% sodium hydroxide in the amount of 13.5 parts, were added, the rate of addition of sodium hydroxide being such as to maintain the pH within the range of 9.0 to 9.5, with a pressure of about 50–60 p.s.i.g. of methyl chloride maintained within the autoclave.

After all of the sodium hydroxide had been added, methyl chloride addition was continued until the pH started to fall off. The mixture was then made alkaline to a pH of 11 to 12 by adding additional 50% sodium hydroxide. The contents of the autoclave were then cooled to about 80° C. and the methyl chloride vented.

The mixture was allowed to stand until a water phase and an oil phase appeared. The lower oil phase, essentially veratraldehyde and some water, was removed from the autoclave and dried in a suitable vessel for about one hour under a vacuum of 30–60 mm. of mercury absolute. After drying, there remained 100 parts of veratraldehyde.

Based on the amount of vanillin used, the yield of veratraldehyde was 94%.

Example 2

Example 1 was repeated using iso-vanillin (3-hydroxy-4-methoxybenzaldehyde) in place of vanillin to produce veratraldehyde in substantially the same yield as obtained by using vanillin.

Example 3

Example 1 was repeated using ortho-vanillin (2-hydroxy-3-methoxybenzaldehyde) in place of vanillin to produce ortho-veratraldehyde in substantially the same yield as obtained by using vanillin to produce veratraldehyde.

Example 4

To an autoclave there were charged 230 parts of water and 40 parts of 50% sodium hydroxide. This solution was agitated and heated to 75–80° C. Seventy-four parts of salicylaldehyde (ortho-hydroxybenzaldehyde) were added to the above solution and the resulting mixture agitated until the salicylaldehyde was completely in solution. The autoclave was evacuated to an absolute pressure of 30–60 mm. of mercury. The temperature of the solution was then raised to about 105° C. and the pH adjusted to 9.0 to 9.5. Methyl chloride and 50% sodium hydroxide in the amounts of 35.6 parts and 13.0 parts, respectively, were added to the solution, the rate of addition of sodium hydroxide being such as to maintain the pH within the range of 9.0 to 9.5, with a pressure of about 50–60 p.s.i.g. of methyl chloride maintained within the autoclave.

After the addition of the sodium hydroxide was completed, the methyl chloride pressure was maintained until the pH started to fall off. The mixture was then made alkaline to a pH of 11 to 12 by adding additional 50% sodium hydroxide. The contents of the autoclave were then cooled to about 80° C. and the methyl chloride vented.

The mixture was allowed to stand until a water phase and an oil phase appeared. The lower oil phase, consisting of methoxybenzaldehyde (ortho-anisaldehyde) and some water, was removed from the autoclave and dried in a suitable vessel for about one hour under a vacuum of 30–60 mm. of mercury absolute. After drying, there remained 75 parts of methoxybenzaldehyde. Based upon the amount of salicylaldehyde charged, the yield of methylbenzaldehyde was 92%.

Example 5

To an autoclave there were charged 235 parts of water and 45 parts of 50% sodium hydroxide. This solution was agitated and heated to 75–80° C. Vanillin (4-hydroxy-3-methoxybenzaldehyde), in the amount of 97.5 parts, was added to the autoclave and the mixture agitated until the vanillin was completely in solution. The temperature of the solution was then raised to about 105° C. and the pH adjusted to 9.0 to 9.5. Ethyl chloride in the amount of 48 parts, and 50% sodium hydroxide in the amount of 13.5 parts, was added, the rate of addition of sodium hydroxide being such as to maintain a pH within the range of 9.0 to 9.5.

After the addition of sodium hydroxide, additional ethyl chloride was added until the pH started to fall off. The mixture was then made alkaline to a pH of 11 to 12 by adding additional 50% sodium hydroxide. The contents of the autoclave were then cooled to about 80° C.

The mixture was allowed to stand until a water phase and an oil phase appeared. The lower oil phase, essentially 4-ethoxy-3-methoxybenzaldehyde, and some water were removed from the autoclave and dried in a suitable vessel for about one hour under a vacuum of 30–60 mm. of mercury absolute. After drying, there is recovered 98 parts of essentially 100% 4-ethoxy-3-methoxybenzaldehyde.

Example 6

To an autoclave there were charged 250 parts of water and 45 parts of 50% sodium hydroxide. This solution was agitated and heated to 85–90° C. 2,4-dihydroxybenzaldehyde, in the amount of 69 parts, was added to the autoclave and the mixture agitated until solution was affected. The temperature of the solution was then raised to about 125° C. and the pH adjusted to 9.0 to 9.5. Butyl chloride in the amount of 95 parts, and 50% sodium hydroxide in the amount of 40 parts, were added, the rate of addition of sodium hydroxide being such as to maintain a pH within the range of 9.0 to 9.5.

After the addition of the sodium hydroxide, additional butyl chloride was added until the pH started to fall off. The mixture was then made alkaline to a pH of 11 to 12 by adding additional 50% sodium hydroxide. The contents of the autoclave were then cooled to about 90° C.

The mixture was allowed to stand until a water phase and an oil phase appeared. The lower oil phase, essentially 2,4-dibutoxybenzaldehyde, and some water were removed from the autoclave and dried in a suitable vessel for about one hour under a vacuum of 30–60 mm. of mercury absolute. After drying, there are recovered 95 parts of essentially 100% 2,4-dibutoxybenzaldehyde.

Further examples of hydroxy aromatic aldehydes having one or more hydroxy groups which can be reacted with alkyl chloride containing 1 to 4 carbon atoms without reaction of the aldehyde group, by the process of this invention as illustrated in the foregoing examples, to produce alkoxy aromatic aldehydes in high yields, are: Hydroxy alkyl benzaldehydes having one or more alkyl groups which can be straight or branched chains containing any number of carbon atoms, such as methyl, butyl, octyl, dodecyl, etc.; hydroxy alkoxybenzaldehydes having one or more alkoxy groups, of which the alkyl substituent can be straight or branched chains containing any number of carbon atoms; dihydroxybenzaldehydes such as 2,4-, 3,4-, and 3,5-dihydroxybenzaldehydes; hydroxy naphthaldehydes such as 2-hydroxy- and 4-hydroxy-1-naphthaldehydes; ring saturated hydroxybenzaldehydes such as hydroxy phenylbenzaldehyde; as well as other hydroxy aromatic aldehydes. Alkyl chloride, for reaction with any of the foregoing hydroxy aromatic aldehydes, can be selected from methyl chloride, ethyl chloride, propyl chlorides, and butyl chlorides.

Metal hydroxides suitable for the purpose of this invention are those metal hydroxides having a molecular weight of from 23 to 75, which include the hydroxides of lithium, sodium, potassium, beryllium, magnesium, and calcium, the most preferred of which are the hydroxides of sodium, potassium, and calcium, with a further preference in that order.

The process of the invention is not limited to exact temperatures, but can be performed within a range of temperatures encompassing the temperatures set forth. For example, although the etherification reaction can be performed at temperatures of from about 75° C. to about 175° C., a temperature of about 105° C., as in the example, is more preferred.

What is claimed is:

1. In a process for producing veratraldehyde, the steps comprising reacting a metal salt of a vanillin with methyl chloride while maintaining the reaction mixture at pH 9.0 to 9.5 and thereafter increasing the pH of the reaction mixture to within the range of 11 to 12 prior to separation of the veratraldehyde from said reaction mixture, said metal being that of a metal hydroxide having a molecular weight of from 23 to 75.

2. In a process for producing veratraldehyde from vanillin, the step comprising, within a closed reaction zone, forming an aqueous reaction mixture by bringing methyl chloride into intimate contact with an aqueous mixture of vanillin and sodium hydroxide while maintaining the temperature of said aqueous reaction mixture within the range of about 75° C. to about 175° C., and maintaining the pH of said aqueous reaction mixture at 9.0 to 9.5 by the addition of sodium hydroxide, and thereafter increasing the pH of the reaction mixture to a pH of 11 to 12 by further addition of sodium hydroxide prior to the separation of veratraldehyde from said reaction mixture.

References Cited in the file of this patent

UNITED STATES PATENTS

| | | |
|---|---|---|
| 519,693 | Bertram | May 15, 1894 |
| 543,193 | Schmidt | July 23, 1895 |
| 545,099 | Schmidt | Aug. 27, 1895 |
| 2,496,803 | McMillan | Feb. 7, 1950 |
| 2,649,436 | Bock et al. | Aug. 18, 1953 |
| 2,694,731 | Bock et al. | Nov. 16, 1954 |

FOREIGN PATENTS

| | | |
|---|---|---|
| 20,264 | Great Britain | Oct. 17, 1891 |

OTHER REFERENCES

Fieser et al.: Organic Chemistry, 2nd edition (1950), pages 137, 138.